Jan. 16, 1923.
O. L. ADAMS.
WINDSHIELD WIPER.
FILED NOV. 28, 1921.
1,442,111.
2 SHEETS—SHEET 1.
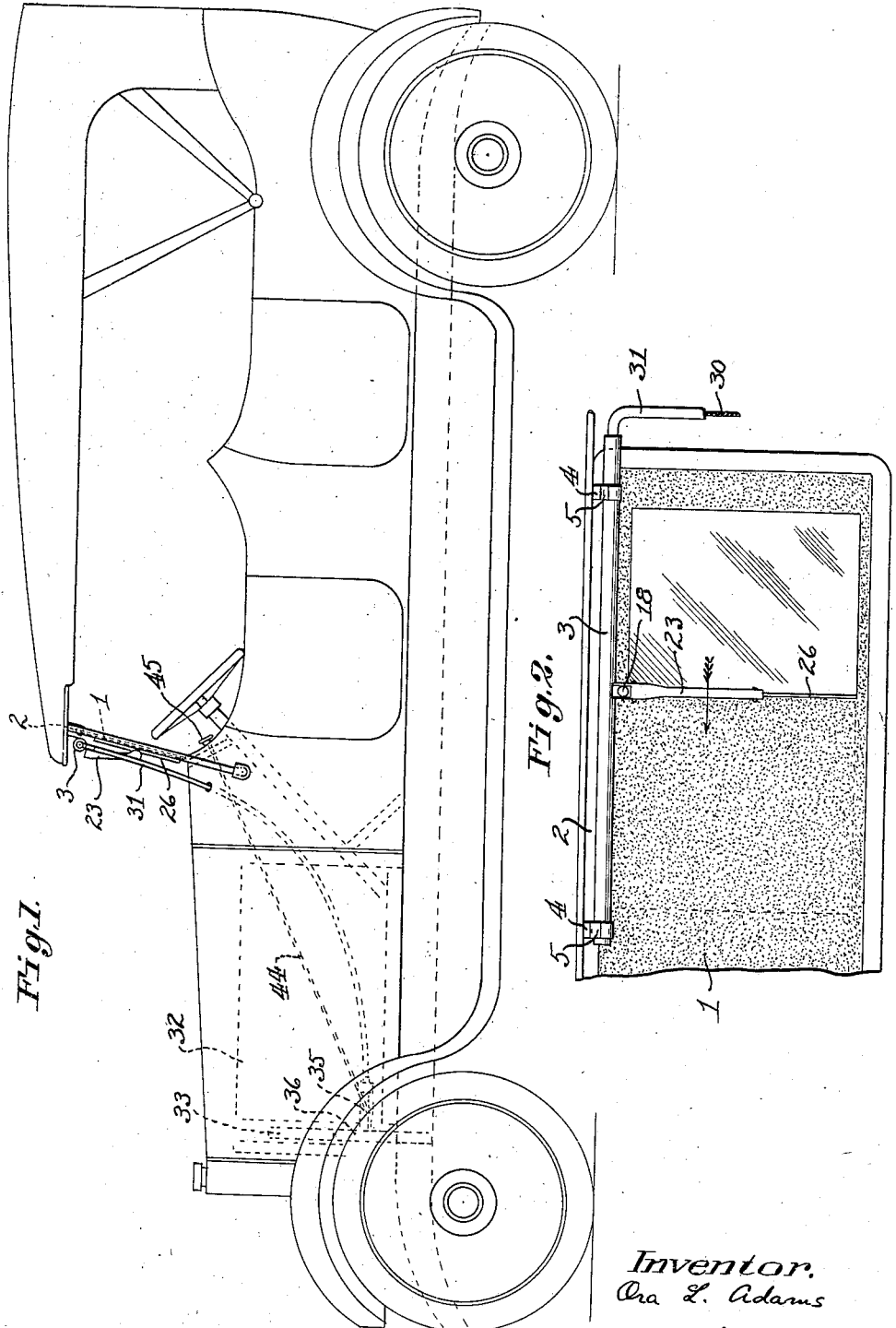
Inventor.
Ora L. Adams
By Booth & Booth,
attorneys.

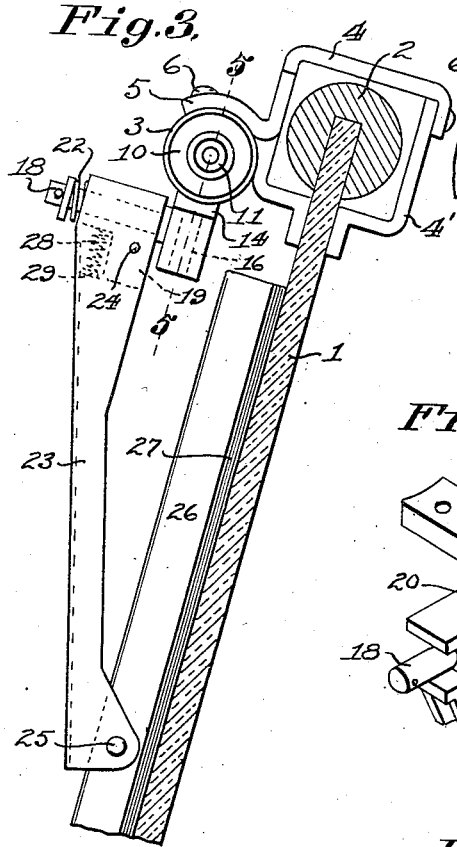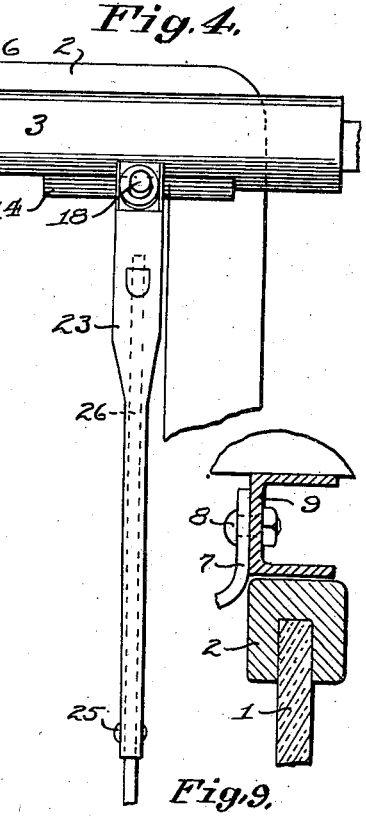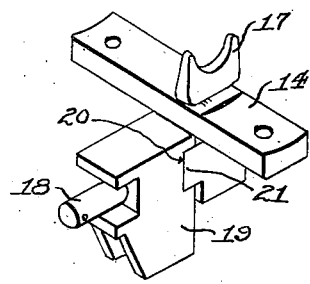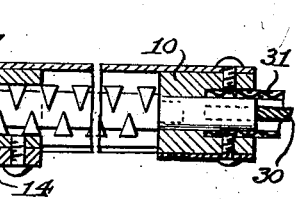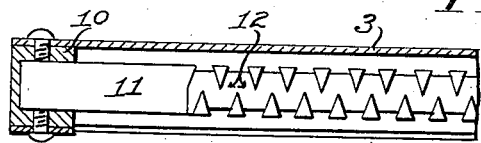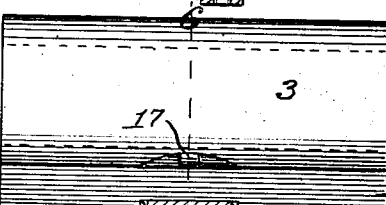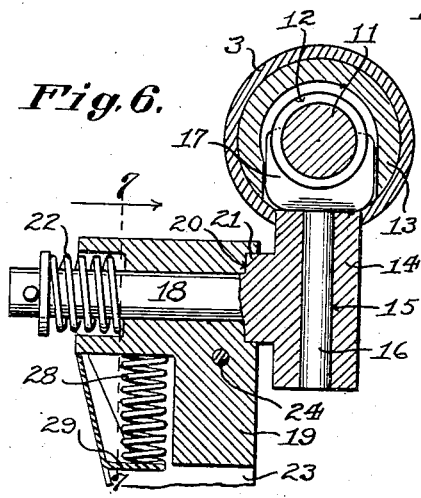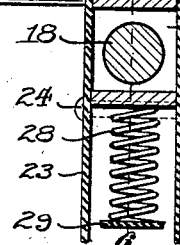

Patented Jan. 16, 1923.

1,442,111

UNITED STATES PATENT OFFICE.

ORA L. ADAMS, OF BERKELEY, CALIFORNIA.

WINDSHIELD WIPER.

Application filed November 28, 1921. Serial No. 518,185.

*To all whom it may concern:*

Be it known that I, ORA L. ADAMS, a citizen of the United States, residing at Berkeley, in the county of Alameda and State of California, have invented certain new and useful Improvements in Windshield Wipers, of which the following is a specification.

My invention relates to devices for cleaning the glass wind-shields of vehicles, and more especially to a power-actuated wiping device for this purpose.

The object of my invention is to provide a device, operated by power received from the driving motor or engine of the vehicle, which will, when called into action at the will of the operator, automatically keep the wind-shield clean and free from rain drops or condensed moisture or dust. A further object of my invention is to provide a device of this type which is simple, is mechanically sound in construction, and effective in operation, and which may be manufactured and attached to existing vehicles at a comparatively low cost.

My invention comprises a wiping-member, driven by a flexible power-transmitting member from some convenient moving part of the engine or propelling mechanism of the vehicle, said member being so associated with the wind-shield that when called into action it linearly reciprocates uninterruptedly back and forth over the surface thereof.

In its preferred form, as herein described and illustrated, my invention is particularly adapted for use upon automobiles, but it may also be applied, without material changes in construction, to other power driven vehicles, such, for example, as street cars. Moreover, it is to be understood that changes, within the scope of the claims hereto appended, may be made in the form and construction of the device without departing from the spirit of the invention.

With this in view, my invention will now be described with reference to the accompanying drawings, wherein—

Fig. 1 is a side elevation of an automobile, showing the preferred arrangement of my wind-shield wiper.

Fig. 2 is a front elevation of a portion of the windshield, showing the position of the wiper.

Fig. 3 is a transverse vertical section, enlarged, of the upper portion of the windshield and wiper.

Fig. 4 is a front elevation, enlarged, of a portion of the wiper.

Fig. 5 is a longitudinal section taken on the line 5—5 of Fig. 3.

Fig. 6 is a detailed transverse section, enlarged, of the operating mechanism, and is taken on the line 6—6 of Fig. 7.

Fig. 7 is a detailed section taken on the line 7—7 of Fig. 6 and viewed in the direction of the arrow.

Fig. 8 is a perspective view of the nut or follower and its trunnion.

Fig. 9 is a sectional detail of the upper portion of a windshield, showing a modified form of bracket for attaching the wiper.

The reference numeral 1 designates the glass pane of the windshield, and 2 the upper frame member therefor. Parallel with said frame member 2, and immediately in front thereof, there is mounted a housing-tube 3, Figs. 1 to 7, which is slotted on its under side, and is attached to said frame member 2 by means of clamps whose two members 4 and 4′, Figs. 3 and 4, embrace said member 2 and clamp upon the glass 1. These clamps have forwardly projecting ears 5 to which the tube 3 is secured by means of screws 6. For attaching the wiper to automobiles having permanent or glass enclosed tops, a bracket, as shown at 7 in Fig. 9, may be used in place of the clamp 4 and 4′. This bracket 7 is secured by a bolt 8 to the roof member 9 which lies above the windshield frame member 2, and it carries the tube 3, not shown in Fig. 13, in a manner similar to that described above.

The housing-tube 3 has interior bushings 10 at each end, in which is journaled a rotatable screw 11, Fig. 5. Said screw, throughout its length, is provided with two concurrent helical grooves 12, having the same depth and pitch, but running in opposite directions, constituting in effect a right and left hand thread, and which may be considered as a single endless helical groove or thread running from one end to the other of the screw 11 and then back to the starting point. A longitudinally slidable sleeve or carriage 13 surrounds the screw 11 within the tube 3, and to said carriage is secured a trunnion 14 which projects through and operates in the slot in said tube. The trunnion has a socket 15, Figs. 5 and 6, in which is mounted the stem 16 of a follower or nut 17. Said follower 17, as shown in Figs. 5, 6 and 8, is, in effect, a single-thread nut embracing only half the screw, and is capable of oscillation within the socket 15 of the trunnion 14 to enable it to follow the threaded groove 12 of the screw 11 in either direction.

The screw 11 rotates continuously in the same direction. The nut 17 follows the helical groove 12 from one end to the other, and then, oscillating slightly in its socket 15, automatically passes into the return groove and follows it back to the first position, where a second oscillatory reversal takes place. The carriage 13 is thus automatically reciprocated from end to end of the tube 3 by the continuous unidirectional rotation of the screw 11.

The trunnion 14 has a forwardly projecting stud 18, Figs. 6 and 8, upon which is mounted a block 19. The inner face of said block 19 is formed with a squared recess 20, which engages a correspondingly formed projection 21 on the trunnion 14, to prevent the block 19 from turning on the stud 18. A spring 22, Fig. 6, normally presses the block 19 inwardly, to cause said squared faces 20 and 21 to engage. Thus by drawing said block 19 outwardly, against the action of the spring 22, it can be turned upon the stud 18 through an angle of 90 degrees, in which position the squared faces 20 and 21 will again come into engagement.

The block 19 lies between the two sides of a substantially U-shaped vertical arm 23, Figs. 3, 6 and 7, and is secured thereto by a pivot pin 24, so that said arm can swing with respect to said block. At its lower end, said arm is pivotally connected at 25, Fig. 3, with the vertical wiper bar 26, which carries a flexible wiping-member 27 of rubber or other suitable material for wiping the surface of the glass 1. A spring 28, Figs. 3, 6 and 7, mounted between an inwardly projecting lip 29 of the arm 23 and the block 19, holds the wiper-member firmly against said glass.

When the device is in use, the parts occupy the positions shown in Figs. 2, 3 and 4, and, when called into use, the wiping-member 27 is uninterruptedly moved back and forth upon the surface of the glass 1. The arm 23, with the wiper bar 26 and wiping-member 27 may be swung out of the way, however, when the device is not in use, by drawing said arm 23 outwardly upon the stud 18, to free the squared faces 20 and 21, and then turning said arm about said stud 18 to bring the wiper into a position parallel with and immediately beneath the housing tube 3. The squared faces 20 and 21 hold the arm 23 and wiper in this position until it is again moved down, manually, into its operative position, as shown in the drawings.

The screw 11 is rotated by means of a flexible shaft 30, Fig. 5, secured to its end, and passing through a flexible stationary tube 31 secured to the tube 3. Said flexible shaft, as shown in Fig. 1, extends down through the cowl of the automobile and under the hood, and is rotated, by means of a friction wheel 36, indicated by dotted lines in Fig. 1, from some exposed moving part of the engine 32, as, for example, the fan belt 33. To move the wheel 36 away from the fan belt 33 there are indicated in Fig. 1 a wire 44 and a pull button 45.

It will be seen from the foregoing that my device is entirely automatic in operation, when once thrown into action by the control pull-button 45. As long as the vehicle engine continues to run, the wiper 27, when thrown into use, travels back and forth across the surface of the windshield, and effectively wipes all moisture or dust therefrom. Moreover, on account of its construction, my device may be made to operate over the entire width of the windshield, if desired, its range of movement depending only upon the length of the screw 11 and tube 3. Thus practically the entire area of the windshield may, if desired, be kept clean. It is also to be noted that as the power is derived from some moving part of the motor, the wiper may be called into action, as soon as the motor is started, and this may be while the vehicle is itself stationary and still standing at the curb, a great advantage over any device which depends for action upon the moving vehicle.

I claim:—

1. A wind-shield wiper comprising a housing member associated with the wind-shield, said member having a longitudinal slot; driving means within said housing member; a carrier member driven by the driving means and projecting through and traveling in the slot of the housing member; a wiper-carrying arm; and connections between said carrier member and said arm adapting the latter to resiliently press its wiper upon the face of the wind-shield and to swing in a plane parallel with said face of the wind-shield to and from operative position.

2. A wind-shield wiper comprising a housing member associated with the wind-shield, said member having a longitudinal slot; driving means within said housing member; a carrier member driven by the driving means and projecting through and traveling in the slot of the housing member; a block rotatively mounted on the carrier member; a wiper-carrying arm pivotally connected with said block, and adapted to swing both to and from the face of the wind-shield and in a plane parallel with said face; a spring to hold the wiper of said arm against said face of the wind-shield; and a spring controlled lock to hold the arm when swung in a plane parallel with said face.

3. A wind-shield wiper comprising a housing member associated with the wind-shield, said member having a longitudinal slot; driving means within said housing member; a carrier member driven by the driving means and projecting through and traveling in the slot of the housing member, said carrier member having a stud extending laterally from its projecting portion; a block rotatively and slidably mounted on said stud; a lock between said block and the projecting portion of the carrier member; a spring to control said lock; a wiper-carrying arm pivotally connected with said block; and a spring coacting with said block and arm to control the movement of said arm about its pivotal connection.

In testimony whereof I have signed my name to this specification.

ORA L. ADAMS.